(No Model.) 2 Sheets—Sheet 2.
C. J. KINTNER.
SYSTEM OF ELECTRICAL DISTRIBUTION.
No. 426,127. Patented Apr. 22, 1890.
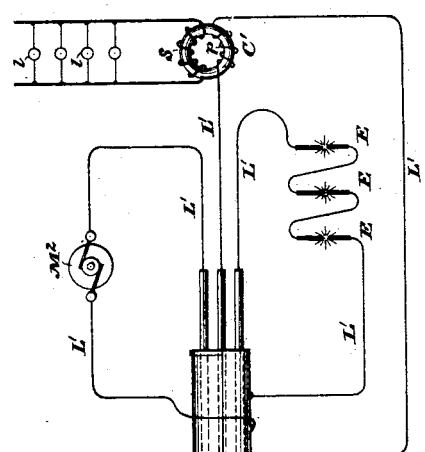
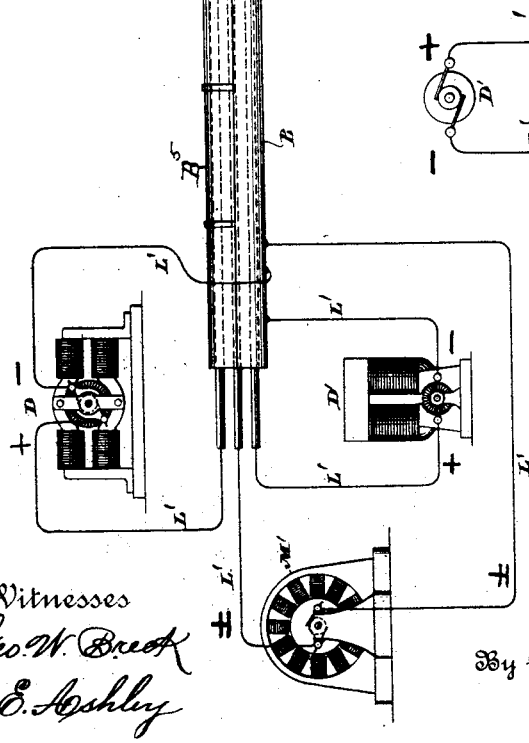
Fig. 3.
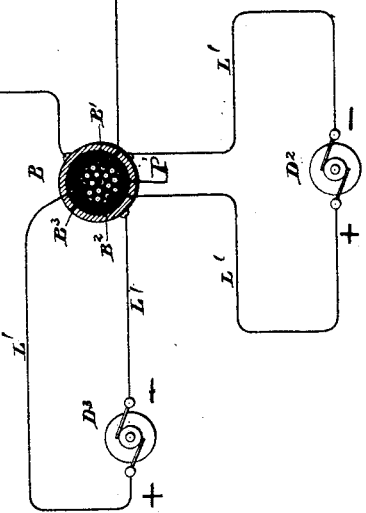
Fig. 4.
Witnesses
Geo. W. Breck
C. E. Ashley
Inventor
Charles J. Kintner
By his Attorneys

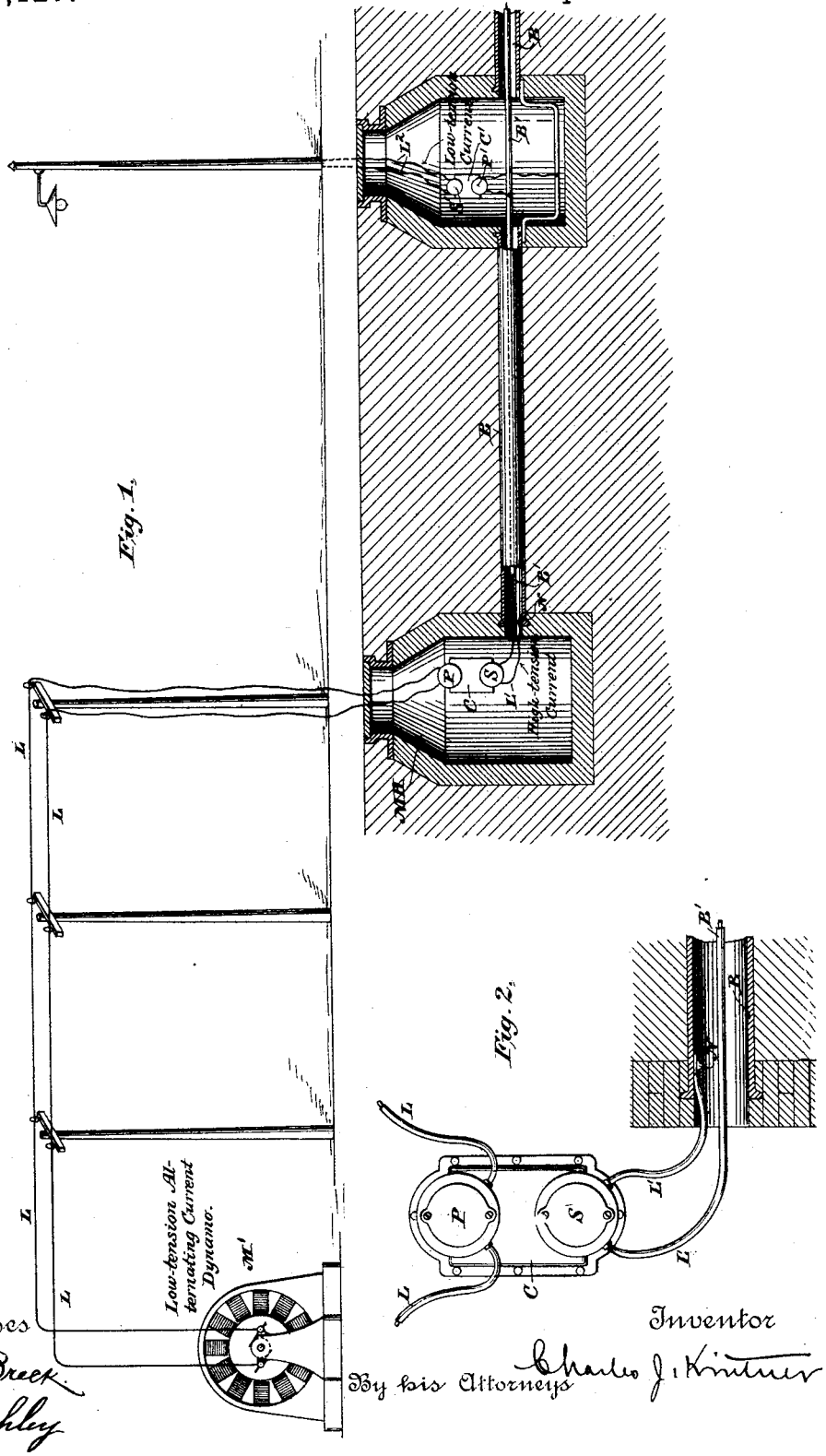

UNITED STATES PATENT OFFICE.

CHARLES J. KINTNER, OF NEW YORK, N. Y.

SYSTEM OF ELECTRICAL DISTRIBUTION.

SPECIFICATION forming part of Letters Patent No. 426,127, dated April 22, 1890.

Application filed December 20, 1889. Serial No. 334,402. (No model.)

*To all whom it may concern:*

Be it known that I, CHARLES J. KINTNER, a citizen of the United States, residing in New York, county of New York, and State of New York, have made a new and useful invention in the Art of Electrical Distribution, of which the following is a specification.

My invention relates particularly to a novel method and system of electrical distribution for use in electric lighting and the transmission of power by electricity, and has especially for its object to insure safety against accidents which arise through the use of high-tension currents of electricity in electric-lighting and kindred electric systems.

To this end my invention consists in the novel methods of and apparatus for distributing electrical energy, as hereinafter described, but more particularly pointed out in the claims which follow this specification.

My invention will be fully understood by referring to the accompanying drawings, in which—

Figure 1 illustrates in elevational and sectional views a plan of electrical distribution in accordance with one part of my improvement. Fig. 2 is a detail view of a converter-box with connections to a system. Fig. 3 is a diagrammatical view showing several independent generators of electricity and as many kinds of apparatus for utilizing electrical energy all connected up in accordance with my novel principle. Fig. 4 is a cross-sectional view of a concentric system of conductors with dynamo-electric machines connected in circuit, the exterior shell constituting the direct or return conductor for the current from the several generators.

I propose to utilize a metallic or conducting conduit, casement, or shell for the return-circuit of all classes of electrical currents, and to carry the advance currents to the source of consumption by insulated conductors located inside said conduit or shell, whether the latter be located above or beneath the earth; but I prefer to locate the outer or conducting shell in the earth, whereby it attains the same potential as the earth, thereby largely diminishing the potential ordinarily required in all wire conductors. With such an arrangement of circuits a minumum amount of danger is incurred. I either generate low-tension currents above ground, carry them to the distributing system below ground, there convert them into high-tension currents, which are carried through concentric conductors to outlying points of consumption still below ground, and then reconvert them into low-tension currents for use above ground, or I generate the high-tension currents in the concentric mains and convert them into low-tension currents at the individual man-holes. They are then carried above ground and distributed.

In Fig. 1, M is a low-tension alternating-current generator, generating, say, one thousand ampères at one hundred volts in a central station and carried by overhead conductors L L to the street and into a man-hole M H to the primary P of a converter C. S is a high-tension secondary converter for converting the current into, say, one thousand volts and one hundred ampères, which is conducted by the insulated central conductor B' to the successive converters C', &c., in multiple arc or series, as desired, back by the return conducting conduit, shell, or casement B, connected directly to earth, and therefore of the same potential as earth. The converters C C are all in the man-holes M H and concealed in insulated converter-boxes, the conductors L L and L' L' being in each set continuous without joints at any point beneath the surface of the earth, with the single exception of the contact-joints N in the interior of the metallic casement or conduit B. By this arrangement of continuous central or interior conductor I obviate unnecessary leakage, and hence there is little liability of short-circuit. To accomplish this result I prefer to construct, or at least put together, the parts of the primary in their positions in the man-holes. The cores of the converters, being of well-known sectional parts, may be slipped in place when the converter-boxes are set up.

In the arrangement shown in Fig. 3 the lower portion of the conducting casement or conduit is continuous, or is made so that there is no possibility of any electrical discontinuity, while the upper portion, of metal or other conducting material or not, as desired, is made in separable sections which may be removed. With this arrangement, should any one of the direct cables or conductors L' L' become damaged, testing-instruments of the usual pattern may be used in the man-holes at the points of generation and service and the fault located definitely, after which the particular cap or cover B⁵ could be unearthed and removed, the fault remedied, and the cover restored; or the cables or conductors L' could be drawn, if desired, in the usual manner. I prefer, however, the former method, as being less liable to do damage to the conductor itself and to neighboring conductors. In this system (shown in Fig. 3) the dynamo D is supplying current to motor M², dynamo D' to arc lights E E E, and the alternating-current dynamo M' is supplying alternating currents to the converter C' through primary P and secondary S to lamps $l\ l\ l$ in multiple arc, all three of said machines receiving their return-current through the common concentric conducting-casement B B, in contact with the earth throughout its length. This feature of earthing the exterior shell or tube, however, when located in the open air, and the method of giving decreased potential to an all-wire circuit are not claimed here, and I hereby reserve such subject-matter as part of a divisional application to be filed in the United States Patent Office prior to the granting of the patent upon this present application.

In Fig. 4 I show several interior advance or direct conductors B' B² B³, &c., each connected to its individual dynamo D' D² D³, &c., and all individually insulated from each other and collectively insulated by a central insulating-pipe P' from their common return conducting casement or conduit B.

By the term "concentric" conductor or conductors as used in this specification and the claims which follow I mean two or more conductors one of which surrounds the other or the others and acts as a return-circuit.

The system above described is equally applicable to overhead conductors, and I adapt it to such use by simply connecting the outer casement or shell B, when used as an overhead conductor, directly to earth at each point of support. In this way, there being absolute earths at definite intervals, there can result no harm to any person or persons touching any part of the system.

With a proper insulation and such precaution against the admission of moisture into the casement or conduit by methods already well-known to those skilled in the art I am enabled with the above system to insure absolute safety to the public and to employés of electric light and power corporations.

I do not limit myself to the specific details of construction herein shown and described, my invention being directed broadly to improved methods and systems of electrical distribution, and upon the principle of conducting electrical currents of high potential through concentric conductors.

I am aware that it is old to permanently locate a compound cable made up of strands of copper twisted together inside of an iron conduit, and to insulate fixedly the entire cable therein, the conduit constituting a return-circuit for the generators and translating devices, substantially as disclosed in patent to T. A. Edison, No. 227,228. Such a system, however, is directed more particularly to the application of low-tension currents, and I make no claim to a construction coming within the terms of said patent, the essential features of my invention being directed to the application of high-tension currents in concentric conductors, the inner conductor or conductors of which is or are removable at will.

Having thus described my invention, what I claim, and desire to secure by Letters Patent of the United States, is—

1. The described method of distributing electricity, consisting in generating low-tension currents and conducting said low-tension currents to a point below the earth's surface and then converting them into high-tension currents and conducting said high-tension currents to outlying points through conductors located entirely beneath the earth's surface, and then converting said high-tension currents again into low-tension currents, and finally conducting the same to the consumers, substantially as described.

2. The described method of distributing electricity, consisting in generating low-tension currents above ground, conducting said low-tension currents to a point below the earth's surface, then converting said low-tension currents into high-tension currents, conducting said high-tension currents to outlying points below the earth's surface, converting said high-tension currents again into low-tension currents, and then conducting said low-tension currents above ground to the consumers, substantially as described.

3. The described method of distributing electrical currents of high tension, consisting in generating high-tension currents at a point below the earth's surface, then conducting said currents to outlying points and back through a conductor having the same potential as the earth, then converting said high-tension currents into low-tension currents at said outlying points, and finally conducting said low-tension currents to consumers, substantially as described.

4. In a system of electrical distribution, a conducting-conduit buried in the earth and a series of removable independently-insulated conductors inclosed in said conduit and surrounded by an insulating pipe or shield P', the conducting-conduit constituting a return-circuit for all of said interior conductors, substantially as described.

5. In a system of electrical distribution, a series of independently-insulated conductors including each an independent source of energy and independent translating devices, in combination with a surrounding conduit constituting the return-circuit for all of said conductors and an insulating-shield P', located between the inclosed conductors and the conduits, substantially as described.

6. A series of removable independently-insulated conductors extending continuously through a conducting-conduit made up of sections joined together by a conductor at each man-hole and independent generators and translating devices connected to each one of the internal conductors and to the conducting-conduit, substantially as described.

7. In a system of electrical distribution, one or more insulated conductors including one or more generators and one or more translating devices, in combination with a conducting casement or conduit having electrical continuity throughout its length and removable top sections for said conduit, substantially as described.

8. In a system of electrical distribution, a metallic or conducting conduit having one portion electrically continuous throughout its length, in combination with removable covers, substantially as described.

9. In a system of electrical distribution, the combination of the following elements: a low-tension alternating-current generator located above ground, conductors connecting said generator with a high-tension converter at a point below ground, a pair of concentric conductors for conducting said high-tension currents to outlying points, one or more, below ground, a low-tension-current converter, one or more, at said points for converting said high-tension currents into low-tension currents, and conductors connecting said converters with translating devices located above ground or at points of actual consumption, substantially as described.

10. In a system of electrical distribution, a conducting-conduit electrically continuous throughout its length, in combination with a series of removable insulated cables, each one of said cables being connected at one end to an independent electrical generator and at the other to an independent set of translating devices, said generators and translating devices in turn being connected directly to the conduit, substantially as described.

11. In a system of electrical distribution, one or more removable insulated conductors located inside a conducting-conduit and including each a source of electrical supply and translating devices, in combination with an insulating shield or tube between the conductor or conductors and the conduit, substantially as described.

12. In a system of electrical distribution, a conducting-conduit made up of sections extending from man-hole to man-hole and connected together electrically at each man-hole, in combination with one or more insulated conductors and an insulating tube or shield in each section located between the sections of the conduit and the interior conductor or conductors, substantially as described.

13. In a system of electrical distribution for electric lighting and the transmission of power, a conducting-conduit, in combination with a series of independently-insulated removable conductors located inside said conduit, each including a generator of electricity adapted to generate high-tension currents, and independent sets of translating devices, and all of said interior conductors being connected at their opposite ends to the conduit, so that it acts as a common return-circuit therefor, substantially as described.

14. In a system of electrical distribution, the combination of an inclosing conducting shield or tube with one or more removable insulated conductors inclosed therein, and electrical generators and translating devices included in circuit with said conductor or conductors and the inclosing-shield, substantially as described.

15. In a system of electrical distribution, an inclosing conducting-shield electrically connected with the earth, in combination with one or more removable insulated electrical conductors inclosed therein and electrical generators and translating devices, one set for each interior conductor, all connected in circuit with the inclosed conductors and the inclosing-shield, substantially as described.

16. In a system of electrical distribution, a conducting shield or conduit surrounding a removable conductor, in combination with an alternate-current generator and one or more converters, said generator and converter or converters being connected in circuit with the interior conductor and its surrounding shield, substantially as described.

CHARLES J. KINTNER.

Witnesses:
OSCAR WOODWARD,
EDW. H. BOOTH.